United States Patent [19]
Yamada et al.

[11] Patent Number: 5,154,957
[45] Date of Patent: Oct. 13, 1992

[54] OPTICAL INFORMATION RECORDING MEDIUM

[75] Inventors: Noboru Yamada, Hirakata; Kenichi Nishiuchi, Moriguchi; Eiji Ohno, Hirakata; Kenichi Nagata, Mino; Nobuo Akahira, Yawata, all of Japan

[73] Assignee: Matsushita Electric Industrial Co., Ltd., Osaka, Japan

[21] Appl. No.: 717,815

[22] Filed: Jun. 19, 1991

[30] Foreign Application Priority Data

Jun. 20, 1990 [JP] Japan .................................. 2-161811

[51] Int. Cl.$^5$ ................................................ B32B 3/00
[52] U.S. Cl. ...................................... 428/64; 428/65; 428/209; 428/210; 428/432; 428/433; 428/913; 346/76 L; 346/135.1; 430/945
[58] Field of Search .................... 428/64, 65, 192, 209, 428/210, 432, 433, 913; 346/76 L, 135.1; 369/288; 430/945

[56] References Cited

U.S. PATENT DOCUMENTS 4,564,850  1/1986  Kazuhara .......................... 346/76 L Primary Examiner—B. Hamilton Hess
Assistant Examiner—Elizabeth Evans
Attorney, Agent, or Firm—Wenderoth, Lind & Ponack

[57] ABSTRACT

An optical information medium has a transparent substrate which has a pair of optically smooth faces; a recording thin film which is formed on one of the faces of the substrate and is subjected to an optically detectable change upon irradiation of a laser beam thereon to; and a reinforcing plate which has a mechanical strength larger than that of the substrate.

19 Claims, 4 Drawing Sheets

OPTICAL INFORMATION RECORDING MEDIUM

BACKGROUND OF THE INVENTION

The present invention relates to an optical information recording medium for recording information at high density by using a high-energy beam such as a laser beam, etc.

A technology is known in which a photosensitive recording layer is formed on a flat surface of a transparent substrate and a laser beam is irradiated onto the recording layer through the substrate so as to produce a change at an irradiated portion of the recording layer such that information is recorded at the irradiated portion. Such a known recording medium is described with reference to FIG. 1. In FIG. 1, the known recording medium includes a pair of substrates 2. A plurality of guide grooves 6 for sequentially guiding a laser beam for recording and reproducing signals to locations for recording are formed on one face 1 of each of the substrates 2. A recording thin-film layer 3 is formed on the face 1 and the substrates 2 are bonded to each other through the recording layers 3 by an adhesive layer 4.

The substrate 2 is formed by a plate made of glass, resin, etc. The recording thin-film layer 3 is formed by a film made of metal having a low melting point, organic coloring matter, amorphous alloy, etc. A technique has been proposed in which rewritable recording is performed by employing as the recording thin-film layer 3 of amorphous alloy. For recording, a method is used in which phase change between amorphous phase and crystalline phase is caused such that change in reflectance therebetween is produced, or a method is used in which the direction of magnetic spin of the magnetic film directed perpendicularly to the substrate can be changed such that reproduction is performed by a magneto-optical effect. In such medium, a protective layer made of dielectric material is provided on the surface of the recording layer or a metallic reflection layer is provided for the purpose of improving absorptance of the recording layer. The known recording medium shown in FIG. 1 includes the two substrates 2. However, a single substrate 2 may be employed in the recording medium.

The substrate 2 usually has a thickness of 1.2 mm. This is because an objective lens for converging a laser beam upon the recording film usually has a numerical aperture of about 0.5 or less in practical use. In FIG. 2, assuming that an objective lens 7 has a numerical aperture NA, an effective diameter D, a focal length f and a working distance WD, the following relation (1) is established.

$$f = D/2NA > WD \quad (1)$$

The above equation indicates that a predetermined limit exists between the focal length f of the objective lens 7 and the thickness t of the substrate 2. Namely, if the thickness t of the substrate 2 is increased while keeping the effective diameter D and the numerical aperture NA of the objective lens 7 to the laser beam 8 which enters into the medium from the substrate side, the working distance WD becomes insufficient and thus, the objective lens 7 may come into contact with the substrate 2. On the contrary, if the thickness t of the substrate 2 is reduced while keeping the effective diameter D and the numerical aperture NA of the objective lens 7, the possibility of the above mentioned inconvenience of contact of the objective lens 7 with the substrate 2 is lessened but the difference between the spot diameter d1 of the laser beam 8 on the surface of the substrate 2 and the spot diameter d2 of the laser beam 8 on the recording film 3 is decreased. As a result, if foreign matter such as dust is present on the substrate 2, quantity of light on the recording film 3 is reduced greatly, thereby resulting in a drop of recording sensitivity or reproducing signal quality. In prior art recording apparatuses having a numerical aperture of about 0.5, a substrate having a thickness of 1.2 mm is employed for the foregoing reasons.

In order to raise recording density higher than that of the prior art recording apparatuses, a procedure may be employed in which convergence of the laser beam is improved by increasing the numerical aperture of the objective lens. In this procedure, it is not practical that the size of an optical recording head be made larger than that of the prior art recording apparatuses. Thus, if an objective lens having a numerical aperture approximately equal to that of the known recording apparatuses is employed, the focal length of the objective lens becomes smaller than that of the prior art recording apparatuses as will be seen from the equation (1). In the case of the hitherto employed substrate 2, the focal surface will be inside the substrate, so that the objective lens having a large numerical aperture cannot be employed. Accordingly, if a objective lens having a large numerical aperture is employed, it becomes necessary to employ a substrate having a thickness smaller than that of the prior art recording apparatuses. For example, if the numerical aperture is set at 0.65 and 0.75, the substrate is required to have thicknesses of about 0.6 mm and 0.3 mm, respectively. However, when thickness of the substrate is merely reduced, the following problems arise. For example, in the case where the substrate is made of resin, the mechanical strength of the substrate drops, so that warpage, deflection, etc. of the substrate occur at the time of formation of the recording film on the substrate and thus, run-out of the surface of the recording medium occurs when the recording medium is rotated for recording or reproduction. If the substrate is made of glass, warpage etc. of the substrate are lessened slightly but a drawback occurs that the substrate is readily cracked when an impact occurs on the substrate.

SUMMARY OF THE INVENTION

Accordingly, an essential object of the present invention is to provide an optical information recording medium and its production method, in which recording can be performed at higher density than prior art optical disks by employing a thinner substrate than those of the prior art optical disks and yet the substrate is free from warpage, deflection, cracking, etc.

In order to accomplish this object of the present invention, an optical information recording medium according to one embodiment of the present invention comprises: a transparent substrate which has a pair of optically smooth faces; a recording thin film which is formed on one of the faces of said substrate and is subjected to an optically detectable change upon irradiation of a laser beam thereon; and a reinforcing plate which has a mechanical strength larger than that of said substrate. The substrate and the reinforcing plate are bonded to each other such that the recording thin film confronts the reinforcing plate. In the case where opposite faces of the recording medium are utilized, a pair of the substrates are bonded to each other with the reinforcing plate therebetween such that the recording thin film of each of the substrates confronts the reinforcing plate. By employing a reinforcing plate having large mechanical strength and rigidity, loss of mechanical strength of the recording medium due to reduction of thickness of the substrate is compensated for. Therefore, even if the substrate having a thickness smaller than those of prior art substrates is employed, warpage, deflection or cracking of the substrate can be lessened. Since a laser beam for recording and reproduction can be guided so as to be incident upon the recording thin film through the substrate, the recording medium of the present invention enables recording at higher density by using an objective lens having a numerical aperture larger than that of prior art recording media.

BRIEF DESCRIPTION OF THE DRAWINGS

This object and features of the present invention will become apparent from the following description taken in conjunction with the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
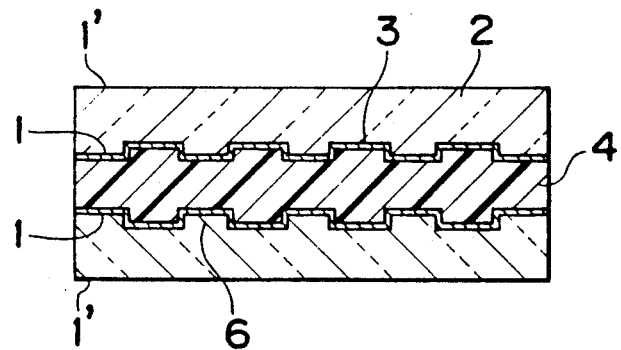
FIG. 1 is a sectional view of a prior art optical information recording medium (already referred to)
Figure 2:
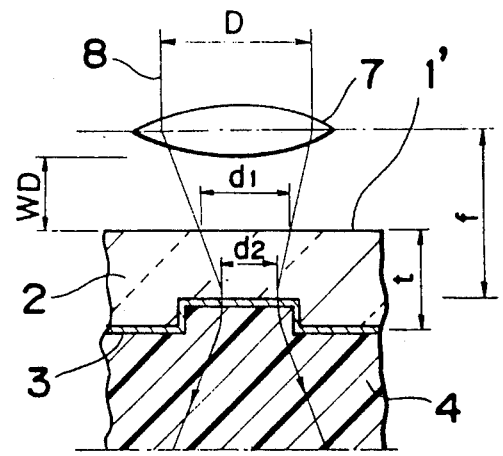
FIG. 2 is a view showing the prior art optical information recording medium of FIG. 1 and an objective lens (already referred to)
Figure 3:
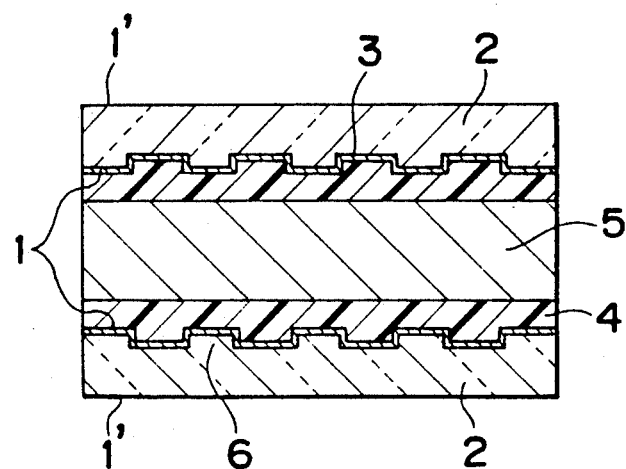
FIG. 3 is a sectional view of an optical information recording medium according to a first embodiment of the present invention.

Referring now to the drawings, there is shown in FIG. 3, an optical information recording medium K1 according to a first embodiment of the present invention. The recording medium K1 includes a pair of transparent substrates 2. Each of the substrates 2 has opposite faces 1 and 1' which are optically smooth. A recording thin-film layer 3 is formed on the face 1 of each of the substrates 2. The substrates 2 are bonded to each other through the recording layers 3 by an adhesive layer 4. The recording medium K1 further includes a reinforcing plate 5 for reinforcing the recording medium K1. The reinforcing plate 5 is inserted into the adhesive layer 4.

The substrate 2 may be made of materials used conventionally for optical information recording mediums, for example, glass and resin such as polymethyl metacrylate (PMMA), polycarbonate, vinyl chloride, amorphous polyolefin or the like. The faces 1 and 1' of the substrate 2 are required to be optically smooth. Generally, in order to sequentially guide, at the time of recording or reproduction, a laser beam to locations for recording, continuous grooves 6 having a configuration of concentric circles or a spiral are preliminarily formed on the face 1 of the substrate 2. Alternatively, a signal pit string may be preliminarily formed along a spiral line on the face 1 of the substrate 2. The substrate 2 has a thickness smaller than 1.2 mm and larger than 0.2 mm. If the substrate 2 has a thickness smaller than 0.2 mm, effect of the reinforcing plate 5 for preventing warpage, deflection, etc. of the substrate 2 diminishes.

Hereinbelow, the recording layer 3 is described. The recording layer 3 is not restricted by the recording mechanism of the recording material forming the recording layer 3. Thus, the recording layer 3 may be made of any arbitrary material in which any change is caused by irradiation of a laser beam thereonto or application of a combination of a magnetic field and a laser beam thereto. As examples of materials in which pits are formed by irradiating a laser beam thereonto, organic coloring matter of phthalocyanine series, azulenium polymethine series, naphthoquinone series, etc. or alloy which is based on Te-Se, Te-Se-Pb and Te-C-H may be employed. A two-layer film of $Bi_2Te_3$-$Sb_2Se_3$ may be employed as material for recording without being deformed. Furthermore, as materials in which reversible change takes place, the following materials which are subjected to phase change may be employed. These materials include (1) material which is based on tellurium (Te) and selenium (Se) such as Ge-Te, Ge-Te-Sn, Ge-Te-Sb, Ge-Te-Sb-Pd, Ge-Te-Sb-Co, Ge-Te-Bi, Ge-Te-Sn-Au, Ge-Se-Te, Sb-Se, Sb-Se-Te, In-Te, Sb-Te, In-Se, In-Sb-Te, In-Sb-Se, In-Se-Tl, In-Se-Tl-Co, Ga-Te-Se, Te-O-Ge-Sn, Te-O-Ge-Sn-Au, In-Te-Au, etc., (2) material which is based on antimony (Sb) such as Ga-Sb, In-Sb, Au-Sb, Ge-Sb, Cu-Sb, Bi-Sb, Zn-Sb, Ag-Sb, etc. and (3) material which utilizes a difference of reflectance due to a change of band structure between metals, e.g. Ag-Zn. Furthermore, in the case where a change of direction of magnetic spin is read out by a magneto-optical effect, the recording layer 3 may be made of material of a rare earth element-transition metal series, for example, Tb-Fe-Co, Gd-Tb-Fe-Co, Gd-Fe-Co, etc. However, in the recording medium of the present invention, since the face of the recording layer 3 is covered with the adhesive layer 4, material which is based on large displacement of substance, for example, recording mechanism such as formation of pits is not so suitable for the recording layer 3 because sensitivity or signal quality deteriorates.

The two substrates 2 are, respectively, bonded to opposite faces of the reinforcing plate 5 by the adhesive layer 4 such that the recording layers 4 are against the adhesive layer 4. The material of the reinforcing plate 5 should satisfy such requirements that its rigidity is greater than that of the substrate 2, its mechanical strength is large and it is not likely to be cracked. Thus, metal is most desirable as the material of the reinforcing plate 5 but may be replaced by resin, glass, ceramics or the like. In addition to the above mentioned requirements, it is desirable that the metal be not likely to be corroded. To this end, either at least one metal selected from a group consisting of Al, Cu, Ni, Ti, Zn, Sn, Fe, Co, Mo and Ta or an alloy mainly containing said one metal may be employed. From a standpoint that the reinforcing plate 5 should be not likely to be bent, an alloy mainly containing Fe, Al, Cu, Ni or the like, for example, stainless steel, duralumin, etc. exhibits excellent properties. When the reinforcing plate 5 is made of stainless steel, duralumin, etc., its thickness can be reduced as compared with a case in which the reinforcing plate 5 is made of Al or Cu. Thickness of the reinforcing plate 5 varies according to the material of the reinforcing plate 5 and the size (diameter) of the recording medium K1. Even when the reinforcing plates 5 are made of an identical material, thickness of the reinforcing plates 5 is increased as the recording medium K1 is made larger so as to lessen warpage and deflection of the substrate 2. When the reinforcing plate 5 is made of resin, this resin may also be used as material of the substrate 2. In this case, it is desirable that the reinforcing plate 5 should have a thickness greater than that of the substrate 2. When the reinforcing plate 5 is made of ceramics, alumina is suitably employed therefor.

Figure 7:
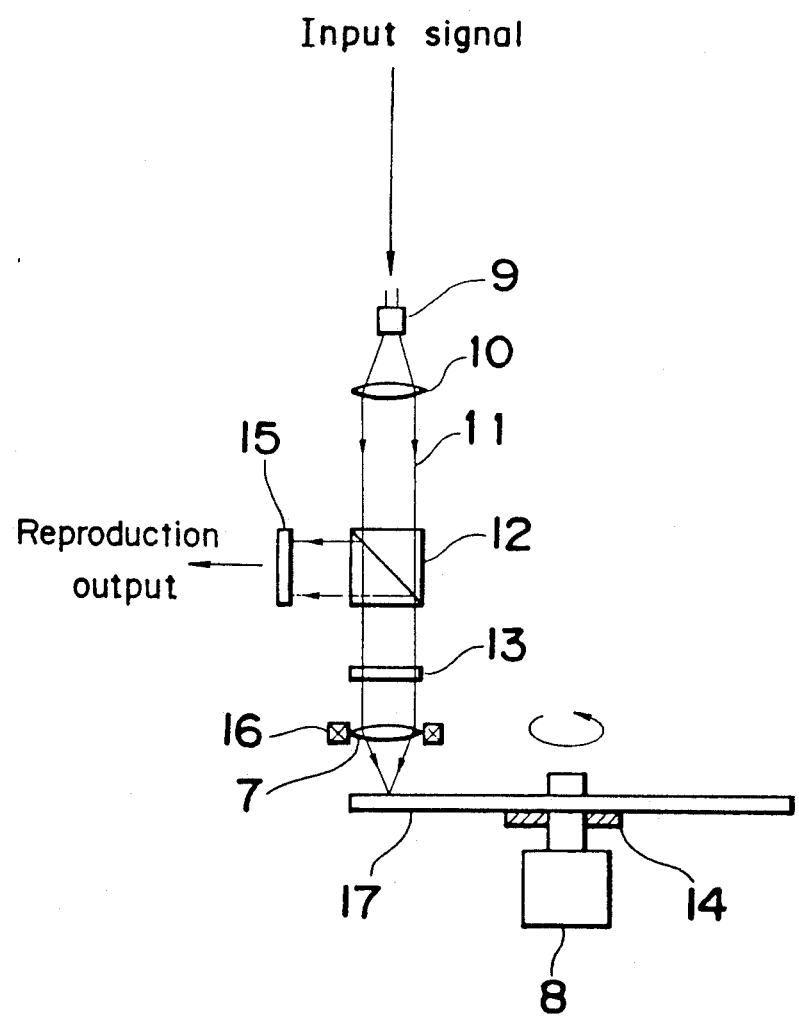
FIG. 7 is a schematic diagram of a recording and reproducing apparatus employing the optical information recording medium of the present invention.

FIG. 7 shows a recording and reproducing apparatus for testing performance of an optical disk 17 in which the recording medium K1 of the present invention is incorporated. In the case where recording is performed by the recording and reproducing apparatus, output of a semiconductor laser 9 is modulated in accordance with an input signal. A laser beam 11 emitted from the semiconductor laser 9 is condensed into a parallel beam by a colimator lens 10 and then is converged upon the optical disk 17 through a beam splitter 12, a λ/4 plate 13 and an objective lens 7. The objective lens 7 can be moved upwardly and downwardly for focusing by a voice coil 16. The optical disk 17 is mounted on a turntable 14 rotated by a motor 8 such that recording corresponding to the input signal is sequentially performed on the optical disk 17. On the other hand, in the case where the signal is reproduced in the recording and reproducing apparatus, output of the semiconductor laser 9 is weakened and it is continuously irradiated onto the optical disk 17. Thus, reflected light from the optical disk 17 is guided so as to be incident upon a detector 15 such that change of output of the detector 15 is used as a reproduction signal.

By using the substrate 2 and the reinforcing plate 5 which are made of various materials and have various sizes, the recording medium K1 of FIG. 3 is obtained. In tests of the thus obtained recording medium K1 by the recording and reproducing apparatus of FIG. 7, thicknesses of the reinforcing plate for various diameters of the recording medium K1, which are shown in Table 1 below, gave excellent results. In Table 1, it is to be noted that thickness of the substrate 2 is smaller than 1.2 mm.

TABLE 1

| Material of reinforcing plate | Minimum thickness of reinforcing plate (mm) Diameter of recording medium | | | | |
|---|---|---|---|---|---|
| | 50 | 86 | 130 | 200 | 300 |
| Metal | 0.1 | 0.15 | 0.2 | 0.3 | 0.4 |
| Resin | 0.2 | 0.3 | 0.5 | 0.8 | 1.0 |
| Ceramics, glass | 0.3 | 0.4 | 0.6 | 0.8 | 1.0 |

Namely, the above described thickness of the reinforcing plate 5 varies according to its material but minimizes warpage of the recording medium K1 even if thickness of the substrate 2 is small. For example, in the case where the reinforcing plate 5 is made of metal, a recording medium K1, which will undergo least warpage can be obtained by setting the thickness of the reinforcing plate 5 at 0.1 mm or more, 0.15 mm or more, 0.2 mm or more, 0.3 mm or more and 0.4 mm or more when diameter of the recording medium is about 50 mm, 86 mm, 120-130 mm, 200 mm and 300 mm, respectively, so that stable rotation of the recording medium K1 can be obtained by minimizing run-out of the surface of the recording medium K1. The case where the reinforcing plate 5 is made of resin, the recording medium K1 which will undergo least warpage leading to stable rotation of the recording medium K1 can be obtained by setting the thickness of the reinforcing plate 5 at 0.2 mm or more, 0.3 mm or more, 0.5 mm or more, 0.8 mm or more and 1.0 mm or more when diameter of the recording medium K1 is about 50 mm, 86 mm, 120-130 mm, 200 mm and 300 mm, respectively. Furthermore, in the case where the reinforcing plate 5 is made of glass or ceramics, the recording medium K1 which will undergo least warpage leading to stable rotation of the recording medium K1 can be obtained by setting the thickness of the reinforcing plate 5 at 0.3 mm or more, 0.4 mm or more, 0.6 mm or more, 0.8 mm or more and 1.0 mm or more when diameter of the recording medium K1 is about 50 mm, 86 mm, 120-130 mm, 200 mm and 300 mm, respectively.

The adhesive layer 4 can be formed by adhesive which is usually used for bonding in optical disks, for example, thermosetting resin adhesive including acrylic resin, epoxy resin, silicone resin, etc.

Figure 4:
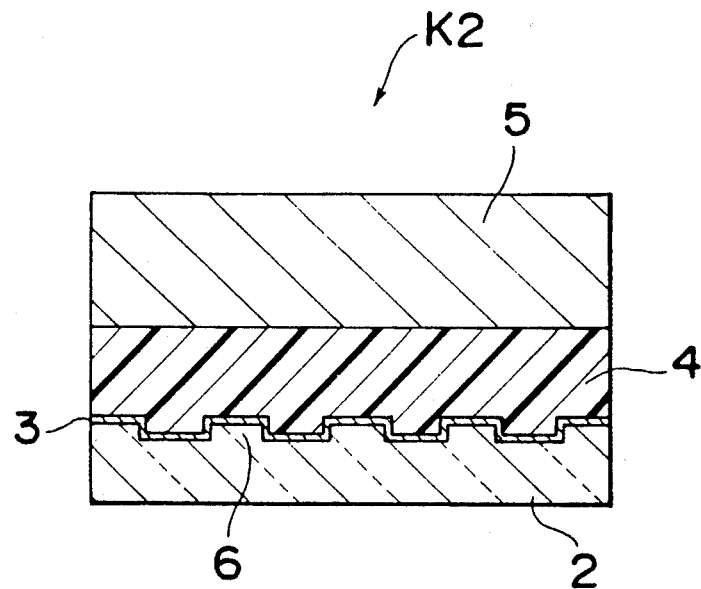
FIG. 4 is a sectional view of an optical information recording medium according to a second embodiment of the present invention.

FIG. 4 shows an optical information recording medium K2 according to a second embodiment of the present invention. The recording medium K2 includes a single substrate 2 and thus, has only one recording face. The recording medium K2 can be made of the same materials as those of the recording medium K1. However, in the recording medium K2, since the single substrate 2 reduces mechanical strength of the recording medium K1 as compared with the recording medium K1, thickness of the reinforcing plate 5 is made larger than that of the recording medium K1.

In the recording mediums K1 and K2, thicknesses of the substrate 2 and the reinforcing plate 5 are so set as to prevent the recording mediums K1 and K2 from becoming excessively thick such that the load on a motor is lessened. Generally, thickness of recording mediums for practical use varies according to size of the recording mediums but may be preferably set to 2–3 mm at its maximum. Therefore, thicknesses of the substrate 2 and the reinforcing plate 5 should be selected such that thickness of the recording mediums K1 and K2 becomes 2 or 3 mm at most.

Figure 5:
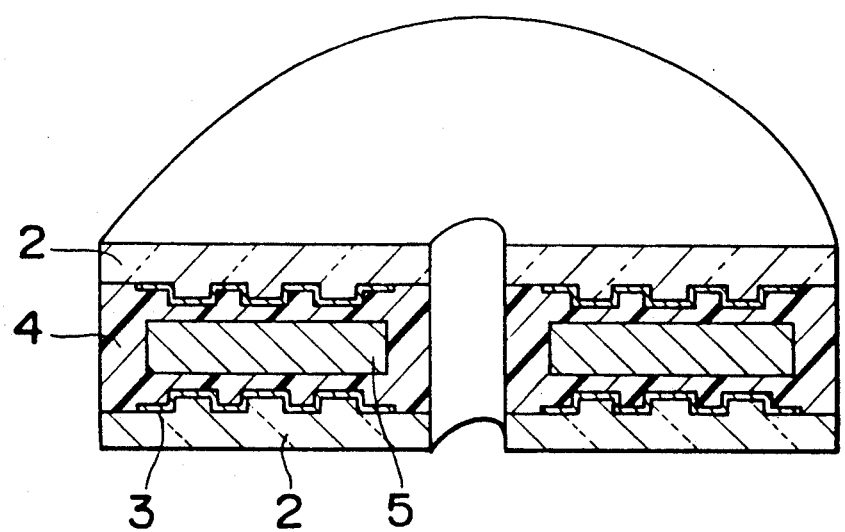
FIG. 5 is a partly sectional perspective view of an optical disk to which the optical information recording medium of FIG. 3 is applied.

FIG. 5 shows an optical disk in which the recording medium K1 of the present invention is incorporated. The optical disk is substantially identical with the recording medium K1 of FIG. 3 structurally. However, in the optical disk, the reinforcing plate 5 is made radially smaller in size than the substrates 2 such that a radially outermost peripheral portion and a radially innermost peripheral portion of the reinforcing plate 5 are embedded in the adhesive layer 4 when the substrates 2 are bonded to each other by the adhesive layer 4. Since the upper and lower substrates 2 are directly bonded to each other by the adhesive layer 4, the upper and lower substrates 2 and the reinforcing plate 5 are bonded to one another. As a result, the optical disk as a whole is formed integrally and thus, its mechanical strength is increased. Since the reinforcing plate 5 is embedded in the adhesive layer 4 as described above, the reinforcing plate 5 is not likely to be corroded in the case where the reinforcing plate 5 is made of metal. In FIG. 5, both of the radially inner and outer peripheral portions of the reinforcing plate 5 are embedded in the adhesive layer 4. However, it can also be so arranged that one of the radially inner and outer peripheral portions of the reinforcing plate 5 is embedded in the adhesive layer 4. Alternatively, neither of the radially inner and outer peripheral portions of the reinforcing plate 5 need be embedded in the adhesive layer 4.

Figure 6A:
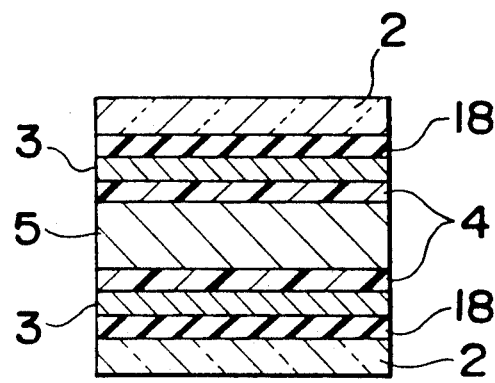
FIGS. 6a to 6c are sectional views showing various examples of structure of the optical information recording medium of FIG. 3, respectively.
Figure 6B:
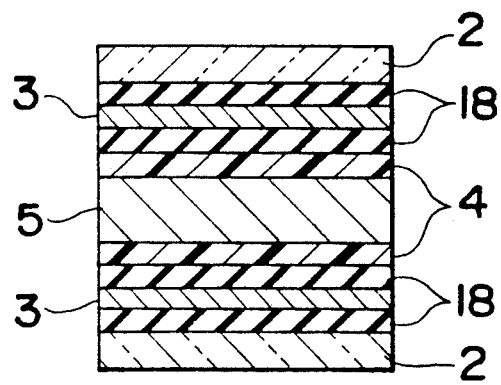
Figure 6C:
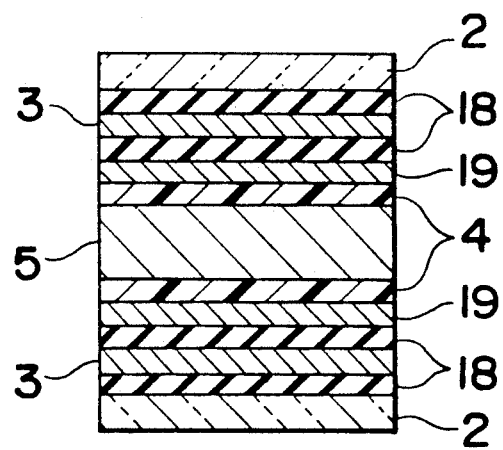

FIGS. 6a to 6c show various examples of structure of the recording medium K1. In FIG. 6a, a layer having a melting point higher than that of the recording layer 3, for example, a dielectric layer 18 is provided between the substrate 2 and the recording layer 3. In FIG. 6b, the recording layer 3 is between two dielectric layers 18. By properly selecting thickness of the dielectric layer 18, the dielectric layer 18 serves to optimize the quantity of optical change between before recording and after recording, reflectance, absorptance, etc. The dielectric layer 18 may be made of (1) oxide such as $SiO_2$, $TiO_2$, $Al_2O_3$, $ZrO_2$, $GeO_2$, etc., (2) nitride such as AlN, SiN, BN, etc., (3) chalcogen compound such as ZnS, ZnSe, etc., (4) diamondlike carbon (DLC) and (5) mixture of these materials such as $ZnS-SiO_2$, $ZnSe-SiO_2$, $Ta_2O_5-TaN$, etc. In the case where sensitivity of the recording layer 3 is insufficient, the dielectric layer 18 disposed between the recording layer 3 and the substrate 2 is made of material having a low coefficient of thermal conductivity so as to restrict thermal diffusion into the substrate 2. In FIG. 6c, a reflection layer 19 is further provided between the dielectric layer 18 and the adhesive layer 4 in the arrangement of FIG. 6b. The reflection layer 19 serves to raise absorptance at the recording layer 3 and may be made of one of Al, Au, Pd, Cu, Ti, Ni, Cr, Ge, Si, Fe, Sb, Sn, Ta, W, etc. or an alloy of these elements, such as Al-Cr, Ni-Cr, Au-Cr, Al-Ti, etc.

Hereinbelow, a production method for the recording medium is described. In the recording medium of the present invention, the recording layer 3, the dielectric layer 18, the reflection layer 19, etc. can be formed on the substrate 2 by vacuum deposition, sputtering, chemical vapor deposition (CVD), ion plating, etc. When the upper and lower substrates 2 are bonded to the reinforcing plate 5, the upper substrate 2, the reinforcing plate 5 and the lower substrate 2 are sequentially piled on one another through the adhesive layer 4 and are heated while being pressed against one another, whereby the opposite faces 1' of the thus obtained recording medium K1 are kept parallel with each other accurately.

Hereinbelow, concrete examples of the recording medium of the present invention are described in more detail.

EXAMPLE 1

This example 1 corresponds to the arrangement of FIG. 5. Two plates made of polycarbonate are prepared as the upper and lower substrates 2, respectively. A continuous spiral groove is formed on the surface of the plate at a pitch of 1.2 μm and the plate has an outside diameter of 86 mm, an inside diameter of 5 mm and a thickness of 0.3 mm. A mixture of $ZnS-SiO_2$ in a film of 175 nm in thickness, a $Ge_2Sb_2Te_5$ film of 20 nm in thickness, a $ZnS-SiO_2$ mixtured film of 25 nm in thickness and an Au film of 30 nm in thickness are sequentially formed on the plate by sputtering. At the time of sputtering, the pressure of argon (Ar) gas is set to 3 mTorr. A plate made of duralumin and having an outside diameter of 82 mm, an inside diameter of 9 mm and a thickness of 0.2 mm is employed as the reinforcing plate 5. The substrates 2 and the reinforcing plate 5 are bonded to each other by epoxy resin as the adhesive layer 4 such that the reinforcing plate 5 is interposed between the recording layers 3 through the adhesive layer 4. As a result, an optical disk of about 0.8 mm in thickness is obtained.

As a comparative example, an optical disk is prepared in which the substrates are bonded directly to each other without using the reinforcing plate.

The optical disk of the present invention and the optical disk of the comparative example are loaded on the recording and reproducing apparatus of FIG. 7 and are rotated at a speed of 1,800 r.p.m. In the case of the optical disk of the present invention, the optical disk is rotated smoothly without run-out of the surface of the optical disk. On the other hand, in the case of the optical disk of the comparative example, run-out of the surface of the optical disk occurs. In the recording and reproducing apparatus, a numerical aperture of an optical head for performing recording and reproduction is set to 0.65 and a laser beam is modulated at a frequency of 2 MHz so as to be irradiated onto the recording layer 3 through the substrate 2 at a power of 5 mW. When the recorded signal is reproduced and the envelope of the reproduced signal is observed by an oscilloscope, a flat envelope is produced and thus, recording can be performed stably during one rotation in the case of the recording medium of the present invention. On the other hand, in the case of the recording medium of the comparative example, the envelope undulates and thus, irregular recording readily takes place during one rotation.

EXAMPLE 2

In this example 2, the optical disk of the example 1 is modified by changing only the material of the reinforcing plate 5 from duralumin to stainless steel. The optical disk of the example 2 achieves the same effects as those of the optical disk of the example 1.

EXAMPLE 3

In this example 3, example 1 is modified by preparing three optical disks of about 1.1 mm, 1.4 mm and 1.4 mm in thickness in which (1) the reinforcing plate 5 is made of nickel and has a thickness of 0.5 mm, (2) the reinforcing plate 5 is made of aluminum and has a thickness of 0.8 mm and (3) the reinforcing plate 5 is made of copper and has a thickness of 0.8 mm, respectively. These optical disks achieve the same effects as those of the optical disk of the example 1.

EXAMPLE 4

This example corresponds to the arrangement of FIG. 3. In this example 4, the optical disks of the examples 1 and 2 are modified by setting the diameter of the optical disk to 50 mm, 130 mm, 200 mm and 300 mm. In the optical disks of the example 4, inside and outside diameters of the reinforcing plate 5 are so set as to be identical with those of the substrate 2. When each of the recording mediums is rotated in the same manner as in example 1, the recording mediums of 50 mm and 130 mm in thickness are rotated smoothly as in example 1. However, in the case of the recording mediums of 200 mm or more in diameter, slightly large run-out of the surface of the recording mediums occurs.

EXAMPLE 5

In this example 5, the recording mediums of 200 mm and 300 mm in diameter in the example 4 are modified by setting thicknesses of the reinforcing plates 5 to 0.3-0.5 mm at intervals of 0.1 mm. When the recording mediums are rotated as in the example 1, the recording mediums of 200 mm in diameter are rotated smoothly in each case. The recording mediums of 300 mm in diameter are rotated smoothly if the reinforcing plate 5 has a thickness of 0.4 mm or more.

EXAMPLE 6

In this example 6, the optical disk of example 1 is modified by changing the material of the reinforcing plate 5 from duralumin to polycarbonate and polymethyl methacrylate (PMMA). At this time, the outside diameter of the reinforcing plate 5 is so set as to be 4 mm smaller than that of the substrate 2, while the inside diameter of the reinforcing plate 5 is so set as to be 4 mm larger than that of the substrate 2. The thicknesses of the reinforcing plates are set to be 0.1-0.5 mm at intervals of 0.1 mm. When these recording mediums are rotated as in the example 2, the recording mediums having the reinforcing plate 5 of 0.3 mm or more in thickness have small run-out and are rotated smoothly.

EXAMPLE 7

In this example 7, the recording mediums of the example 6 are modified by setting the diameter of the recording mediums to 50 mm, 130 mm, 200 mm and 300 mm and setting the thicknesses of the reinforcing plates 5 to 0.1-1 mm at intervals of 0.1 mm. At this time, the outside diameter of the reinforcing plate 5 is so set as to be 4 mm smaller than that of the substrate 2, while the inside diameter of the reinforcing plate 5 is so set as to be 4 mm larger than that of the substrate 2. When the recording mediums are rotated as in the above examples, the recording mediums of 50 mm, 130 mm, 200 mm and 300 mm in diameter are rotated smoothly if thickness of the reinforcing plate 5 is 0.2 mm or more, 0.5 mm or more, 0.8 mm or more and 1 mm or more, respectively.

EXAMPLE 8

In this example 8, the recording mediums of the examples 6 and 7 are modified by changing the material of the reinforcing plate 5 to glass and alumina. In the case where diameter of the recording mediums is set to be 50 mm, 86 mm, 130 mm, 200 mm and 300 mm, the recording mediums are rotated smoothly when thickness of the reinforcing plate 5 is 0.3 mm, 0.4 mm, 0.6 mm and 0.8 mm, respectively.

EXAMPLE 9

In this example 9, the recording mediums of the example 7 and recording mediums of a comparative example obtained by eliminating the reinforcing plate 5 from the recording mediums of the example 7 are prepared. The mechanical strength of these recording mediums is examined by dropping the recording mediums to a floor from a height of 2 m a plurality of times. Each of the recording mediums of the comparative example is cracked and its broken pieces scattered in all five tests.

On the other hand, no abnormal phenomenon takes place in each of the recording mediums of the present invention in five tests. As the number of drops of the recording mediums is increased, cracks are observed in the recording mediums but the phenomenon that broken pieces of the recording mediums scatter does not occur, thereby demonstrating the great safety of the recording mediums of the invention.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical information recording medium comprising:
    a transparent substrate which has a thickness less than 1.2 mm and greater than 0.2 mm and a pair of optically smooth faces;
    a recording thin film on one of the faces of said substrate and which undergoes an optically detectable change upon irradiation by a laser beam;
    a reinforcing plate of a material selected from the group consisting of metal, resin, glass and ceramics, and which has a thickness sufficient to give it a mechanical strength greater than that of said substrate; and
    an adhesive film on one side of said recording thin film remote from said substrate adhering said thin film to said reinforcing plate.

2. An optical information recording medium as claimed in claim 1, wherein the recording mechanism of said recording thin film involves no deformation of said recording thin film.

3. An optical information recording medium as claimed in claim 2, wherein the recording mechanism of said recording thin film is based on a phase change of said recording thin film.

4. An optical information recording medium as claimed in claim 1 in which when said reinforcing plate is made of metal it has a thickness of at least 0.1 mm, when said reinforcing plate is made of resin it has a thickness of at least 0.2 mm, and when said reinforcing plate is made of glass or ceramic it has a thickness of at least 0.3 mm.

5. An optical information recording medium as claimed in claim 4, wherein said metal is at least one metal selected from the group consisting of Al, Cu, Ni, Ti, Zn, Sn, Fe, Co, Mo and Ta.

6. An optical information recording medium as claimed in claim 4, wherein said metal is an alloy mainly containing at least one metal selected from the group consisting of Al, Cu, Ni, Ti, Zn, Sn, Fe, Co, Mo and Ta.

7. An optical information recording medium as claimed in claim 6, wherein said alloy is one of stainless steel and duralumin.

8. An optical information recording medium as claimed in claim 1 in which:
    a. when said reinforcing plate is made of metal and;
        1) the diameter is about 50 mm, said plate has a thickness of at least 0.1 mm;
        2) the diameter is about 86 mm, said plate has a thickness of at least 0.15 mm;
        3) the diameter is about 120-130 mm, said plate has a thickness of at least 0.2 mm;
        4) the diameter is about 200 mm, said plate has a thickness of at least 0.3 mm; and
        5) the diameter is about 300 mm, said plate has a thickness of at least 0.4 mm;

b. when said reinforcing plate is made of resin and;
1) the diameter is about 50 mm, said plate has a thickness of at least 0.2 mm;
2) the diameter is about 86 mm, said plate has a thickness of at least 0.3 mm;
3) the diameter is about 120-130 mm, said plate has a thickness of at least 0.5 mm;
4) the diameter is about 200 mm, said plate has a thickness of at least 0.8 mm; and
5) the diameter is about 300 mm, said plate has a thickness of at least 1.0 mm; and c. when said reinforcing plate is made of glass or ceramics and;
1) the diameter is about 50 mm, said plate has a thickness of at least 0.3 mm;
2) the diameter is about 86 mm, said plate has a thickness of at least 0.4 mm;
3) the diameter is about 120-130 mm, said plate has a thickness of at least 0.6 mm;
4) the diameter is about 200 mm, said plate has a thickness of at least 0.8 mm; and
5) the diameter is about 300 mm, said plate has a thickness of at least 1.0 mm.

9. An optical information recording medium comprising:
a pair of transparent substrates each of which has a thickness less than 1.2 mm and greater than 0.2 mm and a pair of optically smooth faces;
a recording thin film on one of the faces of each of said substrates and which undergoes an optically detectable change upon irradiation by a laser beam;
a reinforcing plate of a material selected from the group consisting of metal, resin, glass and ceramics, and which has a thickness sufficient to give it a mechanical strength greater than that of said substrate; and
an adhesive layer on one side of each of said recording thin films remote from the respective substrates adhering said thin films to said reinforcing plate.

10. An optical information recording medium as claimed in claim 9, wherein recording mechanism of said recording thin film involves no deformation of said recording thin film.

11. An optical information recording medium as claimed in claim 10, wherein the recording mechanism of said recording thin film is based on a phase change of said recording thin film.

12. An optical information recording medium as claimed in claim 9 in which said reinforcing plate is smaller in radial size than said substrates, whereby there is a portion between said substrates from which said reinforcing plate is absent, said substrates being directly bonded at said portions to each other by said adhesive layer.

13. An optical information recording medium as claimed in claim 12 which has a disk-like shape and said portion is at one of a radially outermost peripheral part and a radially innermost peripheral part of the corresponding parts of said substrates.

14. An optical information recording medium as claimed in claim 12 which has a disk-like shape and said portion has a radially outermost peripheral part and a radially innermost peripheral part at the corresponding parts of said substrates.

15. An optical information recording medium as claimed in claim 9 in which when said reinforcing plate is made of metal it has a thickness of at least 0.1 mm, when said reinforcing plate is made of resin it has a thickness of at least 0.2 mm, and when said reinforcing plate is made of glass or ceramic it has a thickness of at least 0.3 mm.

16. An optical information recording medium as claimed in claim 15, wherein said metal is at least one metal selected from the group consisting of Al, Cu, Ni, Ti, Zn, Sn, Fe, Co, Mo and Ta.

17. An optical information recording medium as claimed in claim 15, wherein said metal is an alloy mainly containing at least one metal selected from the group consisting of Al, Cu, Ni, Ti, Zn, Sn, Fe, Co, Mo and Ta.

18. An optical information recording medium as claimed in claim 17, wherein said alloy is one of stainless steel and duralumin.

19. An optical information recording medium as claimed in claim 9 in which:
a. when said reinforcing plate is made of metal and;
1) the diameter is about 50 mm, said plate has a thickness of at least 0.1 mm;
2) the diameter is about 86 mm, said plate has a thickness of at least 0.15 mm;
3) the diameter is about 120-130 mm, said plate has a thickness of at least 0.2 mm;
4) the diameter is about 200 mm, said plate has a thickness of at least 0.3 mm; and
5) the diameter is about 300 mm, said plate has a thickness of at least 0.4 mm;

b. when said reinforcing plate is made of resin and;
1) the diameter is about 50 mm, said plate has a thickness of at least 0.2 mm;
2) the diameter is about 86 mm, said plate has a thickness of at least 0.3 mm;
3) the diameter is about 120-130 mm, said plate has a thickness of at least 0.5 mm;
4) the diameter is about 200 mm, said plate has a thickness of at least 0.8 mm; and
5) the diameter is about 300 mm, said plate has a thickness of at least 1.0 mm; and c. when said reinforcing plate is made of glass or ceramics and;
1) the diameter is about 50 mm, said plate has a thickness of at least 0.3 mm;
2) the diameter is about 86 mm, said plate has a thickness of at least 0.4 mm;
3) the diameter is about 120-130 mm, said plate has a thickness of at least 0.6 mm;
4) the diameter is about 200 mm, said plate has a thickness of at least 0.8 mm; and
5) the diameter is about 300 mm, said plate has a thickness of at least 1.0 mm.

* * * * *